United States Patent
Piwonka et al.

(10) Patent No.: US 7,395,434 B2
(45) Date of Patent: Jul. 1, 2008

(54) METHOD FOR SECURE STORAGE AND VERIFICATION OF THE ADMINISTRATOR, POWER-ON PASSWORD AND CONFIGURATION INFORMATION

(75) Inventors: Mark A. Piwonka, Tomball, TX (US); Mark W. Shutt, Cypress, TX (US); Kevin K. Wong, Houston, TX (US); Patrick L. Gibbons, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 848 days.

(21) Appl. No.: 10/136,245

(22) Filed: May 1, 2002

(65) Prior Publication Data

US 2003/0208696 A1 Nov. 6, 2003

(51) Int. Cl.
*H04L 9/00* (2006.01)
*G06F 13/24* (2006.01)
*G06F 13/32* (2006.01)
*G06F 11/00* (2006.01)

(52) U.S. Cl. .................... 713/183; 710/260; 710/266; 711/164; 713/2

(58) Field of Classification Search ............... 713/184, 713/182, 2, 183
See application file for complete search history.

(56) References Cited

U.S. PATENT DOCUMENTS

| | | | | |
|---|---|---|---|---|
| 5,222,135 A | * | 6/1993 | Hardy et al. ............... 713/183 |
| 5,537,544 A | * | 7/1996 | Morisawa et al. .......... 726/19 |
| 5,748,888 A | * | 5/1998 | Angelo et al. .............. 726/26 |
| 5,963,142 A | * | 10/1999 | Zinsky et al. ............ 340/5.74 |
| 5,982,899 A | * | 11/1999 | Probst ......................... 713/1 |
| 6,032,256 A | * | 2/2000 | Bernard ..................... 726/34 |
| 6,138,240 A | | 10/2000 | Tran et al. ................. 713/202 |
| 6,647,498 B1 | * | 11/2003 | Cho ........................... 726/17 |
| 6,823,464 B2 | * | 11/2004 | Cromer et al. ............. 726/5 |
| 7,200,761 B1 | * | 4/2007 | Freeman et al. .......... 713/184 |
| 2003/0120918 A1 | * | 6/2003 | VanDer Kamp .......... 713/164 |

OTHER PUBLICATIONS

Intel's SL Enhanced Intel486(TM) Microprocessor Family, Jun. 1993, http://www.intel.com/design/intarch/applnots/7014.htm, Aug. 17, 2006.*
*Announcing the Standard for Secure Hash Standard*, Federal Information Processing Standards Publication 180-1, Apr. 17, 1995, 18 pp.

* cited by examiner

*Primary Examiner*—Gilberto Barron, Jr.
*Assistant Examiner*—Virgil Herring

(57) ABSTRACT

A computer includes a processor, an input device and a read only memory ("ROM"). One or more passwords are flashed in the ROM in encoded form. The encoding process may include any well-known encryption or hash process. The password may include a power-on password usable to change the operating state of the computer and/or an administrator password. Such configuration data preferably also is stored on the ROM in encoded form. The encoded nature of the passwords makes it difficult for an unauthorized entity to gain access to the usable form of the passwords. Further, by storing the passwords and configuration in ROM, such as the computer's main system ROM, it is possible to control write access to the ROM because a computer's ROM can generally only be flashed using SMI code which operates outside the control of the computer's operating system and requires entry of a correct password.

27 Claims, 3 Drawing Sheets

METHOD FOR SECURE STORAGE AND VERIFICATION OF THE ADMINISTRATOR, POWER-ON PASSWORD AND CONFIGURATION INFORMATION

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

1. Field of the Invention

The present invention generally relates to computer security. More particularly, the invention relates to secure storage and verification of passwords and configuration information in a computer system. Still more particularly, the invention relates to the use of read only memory ("ROM") and the system management mode ("SMM") to enhance security of passwords and configuration data.

2. Background Information

Many, if not all, computers have a password security feature. There are different uses for passwords. For instance, entry of a correct password may be necessary to log onto a network or even an operating system. Other passwords may be necessary to permit access to a particular service on the network. Further still, many computers have hardware-based passwords that are specific to the use of the computer itself. This disclosure pertains to these types of passwords.

Many computers have two hardware-based passwords—a power-on password and an administrator password. In many computers, these passwords can be enabled or disabled. If enabled, the power-on password permits the computer to complete the initialization process. Accordingly, the computer stops initializing at an early point in the initialization process and prompts the user for a correct power-on password. If a correct password is entered, the computer completes the initialization process. The administrator password is used for changing various configuration features of the computer. For example, many computers have a "hood lock" which typically comprises an electromagnetic solenoid dead bolt. The hood lock is used to prevent someone from opening the computer case to access the electronic components therein. The hood lock can be locked and unlocked via a configuration bit, and to do so requires entry of a correct administrator password. The administrator password may also be required to "flash" (i.e., write) the read only memory ("ROM"), change the administrator and power-on passwords, and perform other types of system level configuration.

Naturally, it is important to maintain a high level of security surrounding the administrator and power-on passwords. With access to these passwords, an unauthorized entity can power on the computer, change the configuration information and even reflash the ROM to cause the system to behave differently (e.g., reflashing the ROM to place a "virus" in the system basic input/output system ("BIOS") firmware). In some computers, the passwords were stored in battery backed-up complimentary metal oxide semiconductor ("CMOS") memory. To prevent an unauthorized entity from accessing the computer and simply reading the passwords from CMOS memory, an application specific integrated circuit ("ASIC") was developed. This ASIC performed the function of continually snooping for read and write accesses to the locations in CMOS memory which include the passwords or other configuration data that was protected. If the ASIC detected accesses to the protected CMOS locations and a valid administrator password had not been entered, the ASIC blocked the access from completing. An example of such an ASIC is disclosed in U.S. Pat. No. 6,138,240, incorporated herein by reference.

Although generally effective, this approach of using a security ASIC added cost and complexity to the computer system. Accordingly, it would be desirable to provide adequate security to a computer's passwords and configuration data without requiring additional hardware components.

BRIEF SUMMARY OF THE PREFERRED EMBODIMENTS OF THE INVENTION

The problems noted above are solved in large part by a computer system that includes a processor, an input device (e.g., a keyboard) and a read only memory ("ROM"). One or more hardware-based passwords are flashed in the ROM in encoded form. The encoding process may include any well-known encryption or hash process. The password may include a power-on password ("POP") usable to change the operating state of the computer (e.g., to enable the computer to power up or to awaken from a low power mode of operation) and/or an administrator password usable to change one or more items of configuration data (e.g., opening or closing a hood lock if present in the computer system). Such configuration data preferably also is stored on the ROM in encoded form (e.g., by encryption or hashing). The encoded nature of the passwords makes it difficult for an unauthorized entity to gain access to the usable (i.e., decoded) form of the passwords.

Further, by storing the passwords and configuration data in read only memory, such as the computer's main system ROM which also contains the BIOS code, it is possible and in fact straightforward to control write access to the ROM without specialized hardware. Generally, a computer's ROM can only be flashed using system management interrupt ("SMI") code which operates outside the ambit and control of the computer's operating system. Typically, upon trying to reflash a ROM, the user is prompted to enter a password (e.g., the administrator password) before the SMI code will permit the reflashing operation to occur. Thus, by storing the passwords in the ROM, the passwords are secured because an unauthorized entity cannot simply overwrite the passwords with known passwords—the passwords cannot be changed unless the unauthorized entity first enters the correct password.

A system and method is described herein to provide security to the system's password(s) and configuration data. More specifically, a process is described to provide verification of a password entered by a user before a password-enabled task can be performed (e.g., changing configuration data). Further, a process is also provided to permit a secured password to be changed. These and other benefits and features will become apparent upon reviewing the following disclosure and accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. To the extent that any term is not specially defined in this specification, the intent is that the term is to be given its plain and ordinary meaning.

DETAILED DESCRIPTION OF THE PREFERRED EMBODIMENTS

Figure 1:
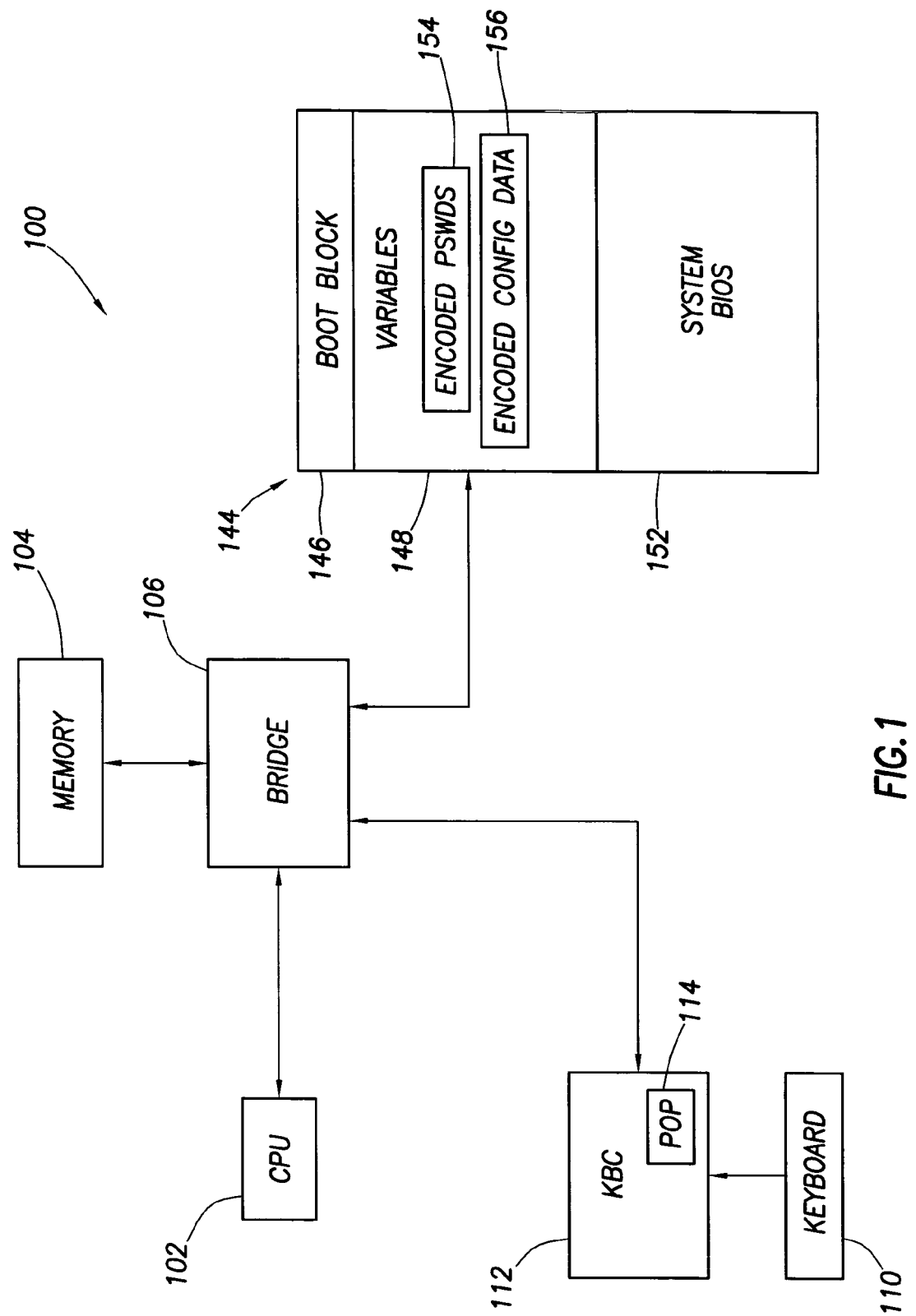
FIG. 1 shows a system diagram of a computer system in accordance with a preferred embodiment of the invention in which encoded passwords and configuration information is stored in the system's read only memory ("ROM")

Referring now to FIG. 1, a computer system 100 is shown constructed in accordance with a preferred embodiment of the invention. As shown, the system 100 includes a central processing unit ("CPU") 102, main system memory 104, a bridge logic device 106, a keyboard controller 112, a keyboard 110, and a read only memory ("ROM") 144. In general, the CPU 102, memory 104, keyboard controller 112 and ROM 144 couple to the bridge 106. The CPU 102 can access memory 104 and ROM 144 and receive input from the keyboard 110 via the keyboard controller 112. Other components well known in the art may be included and the configuration of the devices may be different from that shown in FIG. 1.

The ROM 144 contains various types of information. For example, the ROM includes a boot block 144 which permits the system 100 to begin the boot process in accordance with known techniques. The system basic input/output system ("BIOS") code 152 is also contained in the ROM 144. The BIOS code generally comprises set of executable routines that the computer's CPU 102 can execute to provide low level control over various input/output devices such as hard disk drives, CD ROM drives, keyboards, mouse, and floppy disk drives. The BIOS 152 also contains initialization routines that are executed during system initialization to test and initialize system memory 104 and various other devices in the computer system.

As shown, the ROM 144 also includes storage for variables 148. The variables storage 148 preferably includes storage for encoded passwords 154 and encoded configuration data 156. Other information (not shown) may be stored if desired in variables storage 148. The passwords may include one or more hardware passwords and preferably include an administrator password and a power-on password commonly used in personal computer systems. Either or both passwords can be enabled or disabled as desired in accordance with known techniques. The power-on password ("POP") is used to permit the system to boot up and initialize. Also, in the event the computer transitions to a reduced power mode, the POP preferably is used to "awaken" the system as is well known. The administrator password is used to permit access to (to read or change) one or more items of configuration data such as the hood lock discussed above. Other examples of encoded configuration data include setting to control write protection of a floppy disk drive and settings to enable or disable I/O devices such as serial or parallel ports, USB controllers, audio controllers, etc.

Storing the passwords and the configuration data in encoded form in the computer's ROM 144 solves the problems noted above regarding the use of a device to provide secured access to passwords and configuration data. The ROM 144 comprises a memory device that cannot readily be written. That is, it is possible to write new data to a computer's ROM but a ROM write is not as easy and straightforward as writing data to system memory 104 which comprises random access memory ("RAM"). This point will be elaborated below. At any rate, writes to a ROM device can be, and are, easily controlled and restricted by the CPU 102. Accordingly, an extra hardware security device is not needed to control access to ROM 144. Instead, access to the protected information 154, 156 is controlled as explained in detail below.

The security feature of the preferred embodiment is further strengthened by encoding the information desirably being protected (passwords 154 and configuration data 156). Either or both of the passwords 154 and configuration data 156 are encrypted or hashed, or otherwise encoded, in accordance with any one of a variety of well-known techniques. By encrypting and/or hashing this information and storing the information in encoded form, it is difficult, if not impossible, for an unauthorized entity to obtain the decoded passwords.

Preferably, the administrator password, POP and configuration data are hashed in accordance with any suitable hashing algorithm. The Secure Hash Algorithm ("SHA-1") is one example of a suitable hashing algorithm. SHA-1 and other hashing algorithm generally compute a condensed representation of a message or a data file, or in the present a password or configuration data. As such, the input value to the function is referred to as a "message" and the output hashed value is referred to as a "message digest." The SHA-1 hash function is considered secure because it is computationally infeasible to find an input message which corresponds to a given output message digest, or to find two different input messages which produce the same output message digest. For all intents and purposes, an output hashed message digest can not be reverse engineered to compute the input message that was used to generate the message digest. More information can be found on SHA-1 in the "Federal Information Processing Standards Publication 180-1 Secure Hash Standard" dated Apr. 17, 1995 and incorporated herein by reference.

An encryption algorithm, such as Data Encryption Standard ("DES") (ANSI X3.92, Federal Information Processing Standards Publication 46, National Bureau of Standards) can be used if desired instead of a hash algorithm. A value (e.g., password) can be encrypted and the encrypted value can be decrypted to compute the original value. In accordance with one preferred embodiment of the invention, the POP is encrypted instead of hashed. Encrypting the POP may be particularly useful, and more preferred than hashing, in conjunction with the keyboard controller 112 and various mass storage devices or other peripherals with independent memory and processors for the following reason. In many computer systems, the keyboard controller 112 includes memory storage 114 in which a POP can be stored. Accordingly, when a user enters a POP on the keyboard 110, the keyboard controller 112 verifies the POP. This is the case, for example, when the computer has transitioned to a low power mode of operation (e.g., S3). To "awaken" the computer, the user enters a correct POP on the keyboard 110. Once the keyboard controller 112 verifies the POP, the computer is caused to transition to a fully operational state. In order for the keyboard controller 112 to verify the POP, the CPU 102 coordinates the transfer of the decoded POP to storage 114. If the POP were stored in hashed form in ROM 144, there would be no easy way, as explained above, for the POP to be decoded and written to the keyboard controller 112. The same scenario applies to certain mass storage devices or other peripherals that might be placed in a locked state with a password. A common example is a hard disk drive, traditionally those used in mobile computers with a feature known as "drive lock." It is common to allow the POP to be used as the password for these peripherals. Similar to the keyboard example given above, a controller in the peripheral will compare the password provided by the system CPU to one previously stored in the peripheral device to remove the device from a locked state. By storing the POP in the ROM in encrypted form, the CPU 102 can decrypt the encrypted POP and write the decoded POP to the keyboard controller, mass storage or other peripheral device.

The following discussion will now further explain the advantage of using the computer's ROM 144 as a storage medium for the information 154, 156 to be protected. As noted above, unlike RAM 104 the ROM 144 is not easily accessible for performing write operations. The ROM 144 is non-volatile memory that contains important information and executable code for proper system operation. A malfunctioning ROM can render the system inoperable. For that reason, special care is generally involved before permitting the contents of the ROM to be changed. Further, as is well-known the nature of the ROM itself (as a read only memory device) is such that write access to the ROM is necessarily performed in a way that is much different from how RAM 104 is written to. Write access to a ROM is generally referred to as "flashing" the ROM. This process involves the use of special software that is available in various forms.

One way in which ROM flashing can be initiated in some computer systems is by pressing the "F10" function key while the system is initializing. This will cause the computer to execute specialized code which causes the computer to enter a setup mode in which the ROM 144 can be flashed with a new firmware image. Because the ability to write new data to the ROM is controlled by this specialized code, write access to the protected information 154, 156 can also be protected. A preferred method of such write protection is described below with regard to FIG. 2 which illustrates one suitable method for verifying a password 154 and FIG. 3 which shows one suitable method for changing a password 154.

Figure 2:
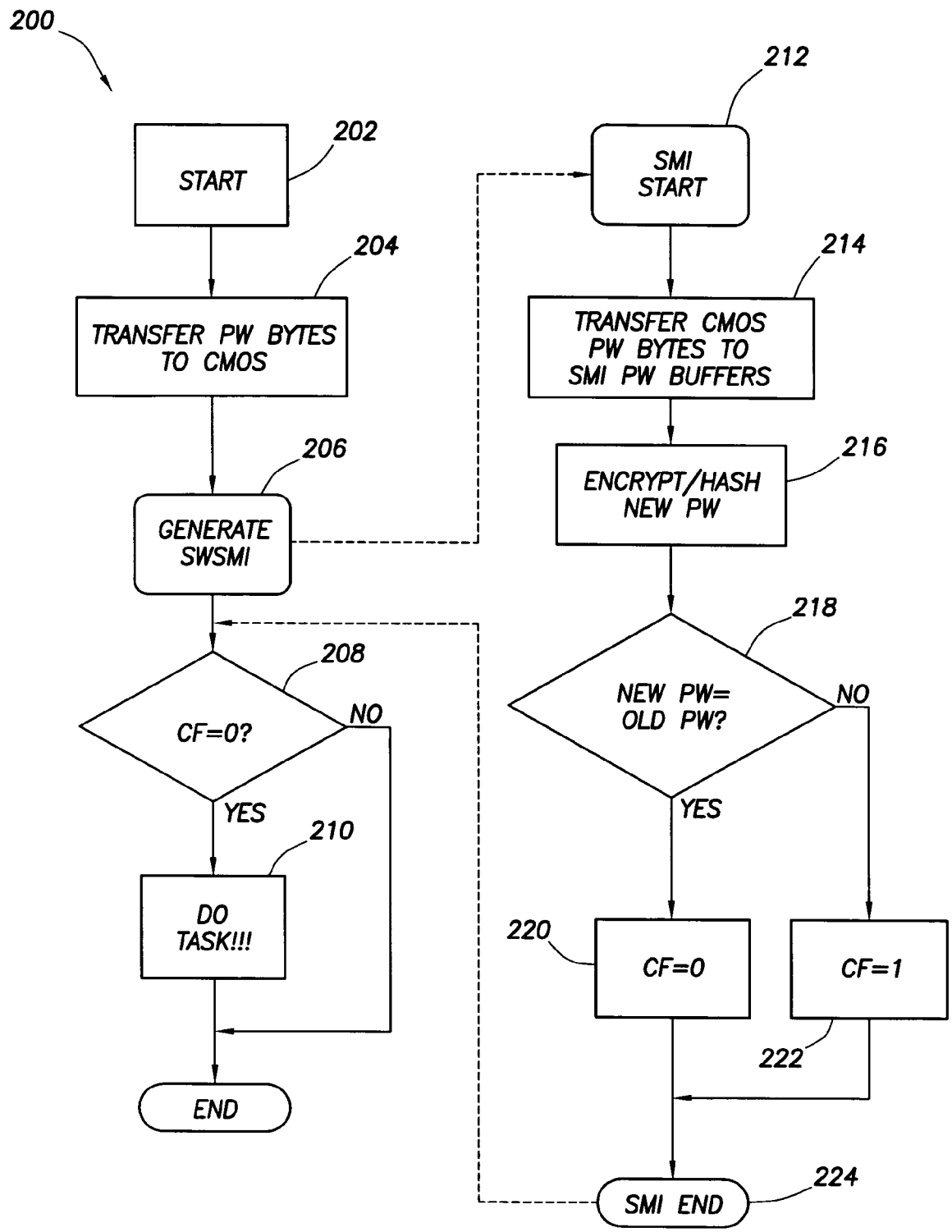
FIG. 2 shows a preferred method for verifying a password.

Referring first to FIG. 2, password verification method 200 can be used to verify any encoded password 154 and, in accordance with the preferred embodiment, the POP and administrator password. The method starts at 202. In the case of a POP, the starting point 202 could be a point during power on self-test ("POST") at which the user is prompted for a correct POP. Also, the starting point 202 could be a point during a user-initiated ROM flashing procedure at which the user is prompted for a correct administrator password. In any event, the user enters the password via keyboard 110, or other input device, and in step 204 the user-entered password is stored temporarily in some suitable type of memory such as CMOS memory (not specifically shown in FIG. 1).

In accordance with known techniques, the system 100 then preferably generates a software system management interrupt ("SMI") in step 206 which cause SMI code to begin executing at 212. The SMI code causes the user-entered password to be transferred from CMOS memory to an SMI memory buffer in memory 104 (step 214). The SMI code also encrypts or hashes the user-entered password in step 216 depending on how the password was encoded and stored in ROM 144. At this point, the SMI code compares at 218 the encrypted or hashed version of the user-entered password with the corresponding password from ROM 144. If the two match, then a flag ("CF") is cleared to a value of 0 in step 220 to indicate the user entered the correct password. If, however, the user's passwords did not match the ROM's password, then the CF flag is set (step 222) to a value of 1 to indicate the failure of the user's password. Finally, the SMI code ends at 224 and control returns to step 208 at which point the status of the CF flag is tested. If the CF flag has a 0 value indicating the password was correct, then the requested task is performed at 210. Otherwise, on a password failure, the requested task is not permitted to perform.

The requested task in step 210 may be any desired task such as completing the initialization and boot process, awaking the computer upon an attempted transition from a lower power mode of operation, changing the value of any of the configuration data 156 (e.g., unlocking the hood lock), and the like. If the user desires to change the state of any of the configuration data, the encoded configuration 156 is decoded (e.g., decrypted) and displayed to the user via a list or other suitable graphical user interface. The user can then change any of the configuration data and, when completed, the system will encode the changed configuration data and flash it back to the ROM 144 using a suitable SMI code-based flashing mechanism.

Figure 3:
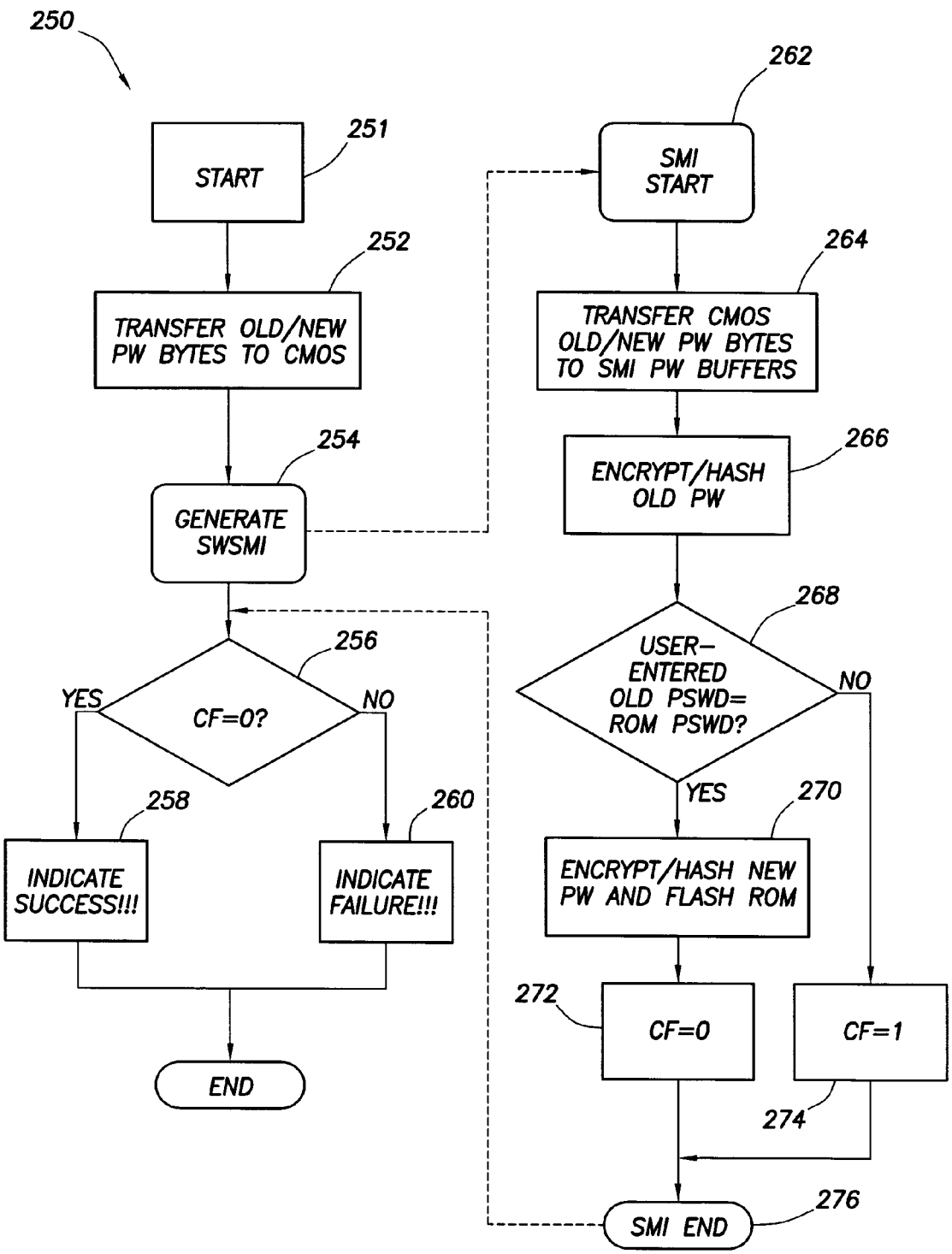
FIG. 3 shows a preferred method for changing a password.

FIG. 3 shows a preferred method 250 to permit any or all of the encoded secure passwords to be changed. The method begins at step 252 which can be initiated in accordance with any known or desired technique such as simply "clicking" on a password change feature on a graphical user interface. In step 252, the user preferably is prompted for entry of the "old" password to be changed and the "new" password. These passwords may be stored temporarily in CMOS memory. As before, a software SMI is generated in step 254 and special SMI code begins executing at 262. In step 264, the user-entered old and new passwords are transferred from the CMOS buffer to an SMI memory buffer. The SMI code in step 266 also encrypts or hashes the old user-entered password to be changed so that the SMI code can verify in step 268 whether the user has entered a correct original (i.e., "old") password. That is, the old password has to be verified before the system will let the user change the password to the new password.

If the encrypted or hashed version of the user-entered original password correctly matches the encoded password from the ROM 144, the SMI code then encrypts (or hashes) the new password entered by the user and flashes that new password into the ROM 144 (step 270). The CF flag is also cleared to a value of 0 at 272 to indicate that the password verification and changing process successfully completed. If, however, the encrypted or hashed version of the user-entered original password does not match the version stored in ROM 144, the user has entered an incorrect password and the CF flag is set to a value of 1 to indicate this failure (step 274). The SMI code ends at 276 and control returns at 256 in which the status of the CF flag is tested. If the flag is set to a value of 0, the password change process is determined to have completed successfully and a message so indicating can be displayed to the user (step 258). If the CF flag comprises a logic 1, the password change process is determined to have failed and an error message can be displayed to the user to indicate that outcome.

As described above, access to the configuration data 156 requires the correct entry of a password (e.g., the administrator password). Without the correct password, the configuration data cannot be changed. The administrator password is stored in encoded (e.g., encrypted or hashed) form in the ROM 144 thereby making it difficult for an unauthorized entity to simply read the ROM to gain access to the passwords. Further, the passwords cannot easily be overwritten with new passwords because SMI code is required to flash the ROM and SMI code falls outside the ambit of the computer's operating system.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a CPU executing an operating system; and
an input device coupled to said CPU; and
a read only memory containing an encoded password and encoded configuration data accessible by a user only upon entering a valid password via said input device;
wherein said password and said encoded configuration data is modified by system management interrupt (SMI) code executed by said CPU without involvement by said operating system; and
wherein a password entered via the input device is verified by the SMI code without involvement of said operating system.

2. The computer system of claim 1 wherein said password comprises a power-on password usable to change the operating state of the computer system.

3. The computer system of claim 1 wherein said password comprises an administrator password usable to change the encoded configuration data.

4. The computer system of claim 1 wherein said read only memory contains two passwords.

5. The computer system of claim 4 wherein said passwords comprise a power-on password usable to change the operating state of the computer system and an administrator password usable to change the encoded configuration data.

6. The computer system of claim 1 wherein said password is encoded using an encryption process.

7. The computer system of claim 1 wherein said password is encoded using a hash process.

8. The computer system of claim 1 wherein said configuration data is encoded using an encryption process.

9. A read only memory device, comprising:
a boot block portion;
system BIOS; and
an encoded password changeable only by system management interrupt ("SMI") based code executed by a processor;
wherein a password entered by a user is compared to the encoded password for verification by the SMI-based code without involvement of an operating system.

10. The read only memory device of claim 9 wherein said password is encoded by an encryption process.

11. The read only memory device of claim 9 wherein said password is encoded by a hash process.

12. The read only memory device of claim 9 wherein said password comprises a power-on password usable to change an operating state of a computer system.

13. The read only memory device of claim 9 further comprising encoded configuration data.

14. The read only memory device of claim 13 wherein said password comprises an administrator password usable to change the state of said encoded configuration data.

15. The read only memory device of claim 13 wherein said configuration data is encoded by an encryption process.

16. A read only memory device, comprising:
a boot block portion;
system BIOS; and
encoded configuration data and an encoded password, both of said configuration data and password changeable only by system management interrupt (SMI) code that executes without involvement from an operating system;
wherein a password entered by a user is compared to the encoded password for verification by the SMI code without involvement of said operating system.

17. The read only memory device of claim 16 wherein said configuration data is encoded by an encryption process.

18. The read only memory device of claim 16 wherein said configuration data is encoded by a hash process.

19. The read only memory device of claim 16 wherein said configuration data includes configuration bits pertaining to a hood lock for a computer system.

20. The read only memory device of claim 16 wherein said password is encoded by an encryption process.

21. The read only memory device of claim 16 wherein said password is encoded by hash process.

22. The read only memory device of claim 16 wherein said password comprises an administrator password usable to change the state of said encoded configuration data.

23. The read only memory device of claim 16 wherein said password comprises a power-on password usable to change an operating state of a computer system.

24. A method of changing a password in a computer system, comprising:
(a) receiving an original password entered by a user;
(b) receiving a new password entered by a user;
(c) generating an SMI;
(d) encoding said user-entered original password;
(e) retrieving an encoded password from a read only memory device previously stored therein;
(f) comparing said user-entered original and encoded password from (d) with the retrieved encoded password from (e); and
(g) changing said password retrieved in (e) with the new password if said encoded passwords match in (f)
wherein (d)-(g) are performed by system management interrupt (SMI) code.

25. The method of claim 24 further comprising precluding changing of said password retrieved in (e) if said encoded passwords do not match in (f).

26. The method of claim 24 wherein (g) includes encoding the new password and flashing a read only memory device with the new password.

27. The method of claim 24 further comprising using the SMI code to verify a user-entered password.

* * * * *

UNITED STATES PATENT AND TRADEMARK OFFICE
CERTIFICATE OF CORRECTION

PATENT NO. : 7,395,434 B2  
APPLICATION NO. : 10/136245  
DATED : July 1, 2008  
INVENTOR(S) : Mark A. Piwonka et al.

It is certified that error appears in the above-identified patent and that said Letters Patent is hereby corrected as shown below:

In column 4, line 40, after "to the" insert -- SHA-1 --.

In column 8, line 53, in Claim 24, after "(f)" insert -- ; --.

Signed and Sealed this

Twenty-first Day of October, 2008

JON W. DUDAS  
*Director of the United States Patent and Trademark Office*